US 6,790,916 B2

(12) United States Patent
Bräuer et al.

(10) Patent No.: US 6,790,916 B2
(45) Date of Patent: Sep. 14, 2004

(54) PROCESS FOR THE PREPARATION OF SOFT, LOW-SHRINKAGE, THERMOPLASTIC POLYURETHANE ELASTOMERS WHICH CAN BE EASILY RELEASED FROM THE MOLD

(75) Inventors: Wolfgang Bräuer, Leverkusen (DE); Herbert Heidingsfeld, Frechen (DE); Hans-Georg Hoppe, Leichlingen (DE); Hans-Georg Wussow, Düsseldorf (DE); Eva Brigitte Eggeling, Köln (DE); Wolfgang Röhrig, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/368,708

(22) Filed: Feb. 19, 2003

(65) Prior Publication Data

US 2003/0162932 A1 Aug. 28, 2003

(30) Foreign Application Priority Data

Feb. 23, 2002 (DE) .......................................... 102 07 774

(51) Int. Cl.$^7$ ............................................... C08G 18/10
(52) U.S. Cl. ..................... 525/457; 525/458; 528/61; 528/65; 264/211.24
(58) Field of Search .................. 525/457, 458; 528/61, 65; 264/211.24

(56) References Cited

U.S. PATENT DOCUMENTS

| 4,202,957 A | 5/1980 | Bonk et al. .................... 528/77 |
| 5,905,133 A | 5/1999 | Müller et al. .................. 528/61 |
| 6,218,479 B1 | 4/2001 | Winkler et al. ............. 525/458 |
| 6,309,313 B1 | 10/2001 | Peter .......................... 473/378 |

FOREIGN PATENT DOCUMENTS

| CA | 1 257 946 | 7/1989 |
| CA | 2025010 | 3/1991 |
| DE | 42 17 367 | 12/1993 |
| DE | 199 39 112 | 2/2001 |
| EP | 571830 | * 5/1993 |
| GB | 1087743 | 10/1967 |

OTHER PUBLICATIONS

Sweeney; Introduction to Reaction Injection Molding; 1979; p. 57.*

* cited by examiner

*Primary Examiner*—Rachel Gorr
(74) *Attorney, Agent, or Firm*—Joseph C. Gil; N. Denise Brown

(57) ABSTRACT

The present invention relates to a process for the production of molding compositions, which can easily be released from the mold. These molding compositions comprise thermoplastic polyurethanes with a hardness of 45 to 65 Shore A, with good mechanical properties, with low shrinkage and good low temperature properties.

4 Claims, No Drawings

PROCESS FOR THE PREPARATION OF SOFT, LOW-SHRINKAGE, THERMOPLASTIC POLYURETHANE ELASTOMERS WHICH CAN BE EASILY RELEASED FROM THE MOLD

BACKGROUND OF THE INVENTION

The invention relates to a process for the preparation of soft, low-shrinkage molding compositions of thermoplastic polyurethanes, which can be easily released from the mold, have good low-temperature properties, good mechanical properties and a hardness of 45 to 65 Shore A.

Thermoplastic polyurethane elastomers (TPU's) have been known for a long time. They are of industrial importance because of the combination of high-quality mechanical properties with the known advantages of inexpensive, thermoplastic processability. A wide range of variation of mechanical properties can be achieved by using various chemical builder components. An overview of TPU's and their properties and uses is given e.g. in Kunststoffe 68 (1978), 819 or in Kautschuk, Gummi, Kunststoffe 35 (1982), 568.

TPU's are built up from linear polyols, usually polyester or polyether polyols, organic diisocyanates and short-chain diols (chain lengtheners or chain extenders). Catalysts can additionally be added to accelerate the formation reaction. To adjust the properties, the builder components can be varied within relatively wide molar ratios. Molar ratios of polyols to chain lengtheners/extenders of 1:1 to 1:12 have proved appropriate. This usually results in products characterized by a hardness in the range from 80 Shore A to 75 Shore D.

The hardness of a TPU is substantially established by the ratio of hard segment (chain lengthener/extender+ isocyanate) to soft segment (polyol+isocyanate). If the amount of hard segment is reduced downwards beyond the limit of 80 Shore A mentioned, the resulting products are tacky products which solidify poorly, exhibit poor releasability from the mold in injection molding processing and exhibit severe shrinkage.

No economically acceptable injection molding cycle times and no adequate dimensional accuracy of the injection-molded components are ensured with such TPU's. In addition, an incipient soft segment crystallization at slightly below room temperature often leads to a significant increase in hardness, and the elastic properties at these low temperatures deteriorate such that the use value of such TPU at low temperatures is reduced.

EP-A 0 134 455 shows that by using plasticizers from specific phthalates and phosphates, TPU's with a hardness of 60 to 80 Shore A are obtained. However, these plasticized TPU, like all plasticized plastics, show disadvantages due to the use of the plasticizers, such as, for example, bleeding of the plasticizer with after-hardening and odor problems. When these are in contact with rigid thermoplastics, stress cracking can occur.

EP-A 1 031 588 describes soft polyurethane molding compositions of low shrinkage in the hardness range from 76 to 84 Shore A by mixing of a 68 Shore A TPU A with an 85 Shore A TPU B. The harder TPU B employed is prepared by a specific prepolymer procedure, the polyol being reacted with the diisocyanate in a molar NCO:OH ratio of 1:2.05 to 1:6.0, so that the shrinkage of the mixture is reduced and a good dimensional accuracy is achieved. This process is of course limited in its effect at very low Shore A values in the range below 75 Shore A.

In DE-A 199 39 112, a previously prepared TPU of 30 to 80 Shore D hardness is degraded in the first part of an extruder with the addition of low molecular weight diols to give the large hard segment blocks; a new soft TPU is then produced in the second part with the addition of isocyanates, polyols and catalysts. These TPU's have good mechanical values and a reduced abrasion. The preparation process described is very involved, and it is therefore very difficult to maintain the TPU properties in a controlled manner. In addition, the ease of release from the mold in injection molding processing is not particularly good.

DE-A 2 842 806 describes the production of TPU in twin-screw kneading machines under special shearing conditions, in which one or two monomer streams are subdivided into at least two portions. TPU's having increased low-temperature notched impact strength and increased rigidity, i.e. Shore hardnesses of higher than 57 Shore D are obtained.

DE-A 4 217 367 describes TPU's in the range from 70 Shore A to 75 Shore D, which are obtained by a multi-stage reaction which is characterized in that, in the first stage, macrodiols are reacted with diisocyanate in a ratio of 1.1:1 to 5.0:1, in the second stage, the remaining diisocyanate is added, and, in the third stage, the reaction with the chain extender takes place. Products are obtained which have improved mould release properties and improved stability under load, while retaining the same hardness and low-temperature properties. TPU's which are softer than 70 Shore A cannot be obtained with the polyesters and polyethers described in the examples using the process described in this reference. If the quantity of the hard segment is reduced to below the limit mentioned of 70 Shore A, products are obtained which, as a result of soft segment crystallization, can only retain their hardness range for short periods of time and subsequently harden to a major degree upon storage or heating.

The object of the present invention was therefore to provide a process with which very soft TPU's in the range from 45 to 65 Shore A can be prepared, which at the same time are easy to release from the mold, show a very low shrinkage, and, in addition, are still highly elastic even at low temperatures.

It has been possible to achieve the object by the process for the production of thermoplastic polyurethane elastomers according to the invention.

SUMMARY OF THE INVENTION

The invention provides a process for the preparation of thermoplastically processable polyurethane elastomers which are easy to release from the mold and have a hardness of 45 to 65 Shore A (as measured in accordance with DIN 53505), a tensile strength of greater than 12 MPa (as measured in accordance with ISO 37), a shrinkage of $\leq 3.5\%$ (as measured in accordance with DIN 16770, part 3) and a DMA storage E modulus in tension at $-10°$ C. of less than 20 MPa (the measurement of the E modulus is explained in more detail in the examples section) comprising A) reacting, optionally in the presence of catalysts,
   (1) one or more linear hydroxyl-terminated polyols selected from the group consisting of:
      a) polyester polyols with number-average molecular weights of 450 to 5,000, which are obtained by reacting a mixture of at least two different polyhydric alcohols with one or more dicarboxylic acids having a maximum of 12 C atoms,
      b) mixtures of at least two polyester polyols having different number-average molecular weights of 450 to 5,000, c) mixtures of at least two polyether polyols having different number-average molecular weights of 450 to 5,000,
d) polyether polyols having number-average molecular weights of 450 to 5,000 and containing at least two different alkylene oxide units, and
e) polyether polyols containing one alkylene oxide unit and having number-average molecular weights of 450 to 1,500, with (1) one or more organic diisocyanates in a molar NCO/OH ratio of 1.1:1 to 1.9:1, preferably 1.1:1 to 1.7:1 to form an isocyanate-terminated prepolymer, B) mixing the prepolymer prepared in step A) with preferably the same organic diisocyanate as under step A), and C) reacting the mixture obtained in step B) with one or more diol chain extenders having molecular weights of 60 to 400, wherein a molar NCO:OH ratio of the components employed in A), B) and C) of from 0.9:1 to 1.1:1 is adjusted and wherein the ratio of the OH groups of the polyol to the OH groups of the chain extender is 0.3:1 to 2.0:1, and particularly preferably 0.4:1 to 1.5:1.

DETAILED DESCRIPTION OF THE INVENTION

Possible organic diisocyanates include, for example, aliphatic, cycloaliphatic, araliphatic, heterocyclic and aromatic diisocyanates, such as are described in, for example, Justus Liebigs Annalen der Chemie, 562, pages 75 to 136.

There may be mentioned specifically by way of example diisocyanates including: aliphatic diisocyanates, such as hexamethylene-diisocyanate, cycloaliphatic diisocyanates, such as isophorone-diisocyanate, 1,4-cyclohexane-diisocyanate, 1-methyl-2,4-cyclohexane-diisocyanate and 1-methyl-2,6-cyclohexane-diisocyanate and the corresponding isomer mixtures, 4,4'-dicyclohexylmethane-diisocyanate, 2,4'-dicyclo-hexylmethane-diisocyanate and 2,2'-dicyclohexylmethane-diisocyanate and the corresponding isomer mixtures, aromatic diisocyanates, such as 2,4-toluylene-diisocyanate, mixtures of 2,4-toluylene-diisocyanate and 2,6-toluylene-diisocyanate, 4,4'-diphenylmethane-diisocyanate, 2,4'-diphenylmethane-diisocyanate and 2,2'-diphenylmethane-diisocyanate, mixtures of 2,4'-diphenylmethane-diisocyanate and 4,4'-diphenylmethane-diisocyanate, urethane-modified liquid 4,4'-diphenylmethane-diisocyanates or 2,4'-diphenyl-methane-diiso-cyanates, 4,4'-diisocyanato-1,2-diphenylethane and 1,5-naphthylene-diisocyanate. 1,6-Hexamethylene-diisocyanate, 1,4-cyclohexane-diisocyanate, isophorone-diisocyanate, dicyclohexyl-methane-diisocyanate, diphenylmethane-diisocyanate isomer mixtures with a 4,4'-diphenyl-methane-diisocyanate content of more than 96 wt. %, 4,4'-diphenyl-methane-diisocyanate and 1,5-naphthylene-diisocyanate are preferably used. The diisocyanates mentioned can be used individually or in the form of mixtures with one another. They can also be used together with up to 15 mol % (calculated for the total diisocyanate) of a polyisocyanate, but polyisocyanate should be added at most in an amount such that a product which is still thermoplastically processable is formed. Examples of polyisocyanates are triphenylmethane-4,4',4"-triisocyanate and polyphenyl-polymethylene polyisocyanates, Linear hydroxyl-terminated polyols are employed as the polyols. Due to their production, these often contain small amounts of non-linear compounds. They are therefore often also referred to as "substantially linear polyols".

Suitable polyether diols can be prepared by, for example, reacting one or more alkylene oxides having 2 to 4 carbon atoms in the alkylene radical with a starter molecule which contains two active hydrogen atoms in bonded form. Alkylene oxides which may be mentioned include, for example, ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides can be used individually, successively in alternation or as mixtures. Possible starter molecules are, for example: water, amino alcohols, such as N-alkyl-diethanolamines, for example, N-methyl-diethanolamine, and diols, such as ethylene glycol, 1,3-propylene glycol, 1,4-butanediol and 1,6-hexanediol. Mixtures of starter molecules can optionally also be employed. Suitable polyether-ols are furthermore the polymerization products of tetrahydrofuran containing hydroxyl groups. It is also possible to employ trifunctional polyethers in amounts of 0 to 30 wt. %, based on the bifunctional polyethers, but at most in an amount such that a product which is still thermoplastically processable is formed. The substantially linear polyether diols preferably have number-average molecular weights $\overline{M}_n$ of 450 to 5,000.

Polyethers are preferably employed which have at least two different alkylene oxide groups and are obtainable for example by reacting a mixture of ethylene glycol and 1,3-propylene glycol, a mixture of ethylene glycol and butanediol, a mixture of 1,3-propylene glycol and butanediol, a mixture of butanediol and 1,5-pentanediol or a mixture of butanediol and neopentyl glycol. These polyethers preferably have number-average molecular weights of 450 to 5,000.

In addition, it is also possible to use mixtures of at least two polyether diols having different number-average molecular weights in the range from 450 to 5,000. The different molecular weights of the polyethers in the mixture can be obtained by using different alcohols and/or, where identical alcohols are used, by the way of the chain length.

Polyether diols containing one alkylene oxide unit and having number-average molecular weights $M_n$ of 450 to 1,500 are also preferred.

Suitable polyester diols can be prepared, for example, from dicarboxylic acids having 2 to 12 carbon atoms, preferably 4 to 6 carbon atoms, and polyhydric alcohols. Such dicarboxylic acids include, for example: aliphatic dicarboxylic acids, such as succinic acid, glutaric acid, adipic acid, suberic acid, azelaic acid and sebacic acid, or aromatic dicarboxylic-acids, such as phthalic acid, isophthalic acid and terephthalic acid. The dicarboxylic acids can be used either individually or as mixtures such as, for example, in the form of a succinic, glutaric and adipic acid mixture. For preparation of the polyester diols it may optionally be advantageous to use, instead of the dicarboxylic acids, the corresponding dicarboxylic acid derivatives, such as carboxylic acid diesters having 1 to 4 carbon atoms in the alcohol radical, carboxylic acid anhydrides or carboxylic acid chlorides. Examples of polyhydric alcohols are glycols having 2 to 10, preferably 2 to 6 carbon atoms including, for example, ethylene glycol, diethylene glycol, 1,4-butanediol, 1,5-pentanediol, 1,6-hexanediol, 1,10-decanediol, 2,2-dimethyl-1,3-propanediol, 1,3-propanediol or dipropylene glycol. The polyhydric alcohols can be used by themselves or as a mixture with one another, depending on the desired properties. Esters of carbonic acid with the diols mentioned, in particular those having 4 to 6 carbon atoms, such as 1,4-butanediol or 1,6-hexanediol, condensation products of ω-hydroxycarboxylic acids, such as ω-hydroxycaproic acid, or polymerization products of lactones, e.g. optionally substituted ω-caprolactones, are furthermore suitable. Polyester diols which are preferably used include ethanediol polyadipates, 1,4-butanediol polyadipates, ethanediol-1,4-butanediol polyadipates, 1,6-hexanediol-neopentylglycol polyadipates, 1,6-hexanediol-1,4-butanediol polyadipates and polycaprolactones.

The polyester diols used have number-average molecular weights $M_n$ of 450 to 5000.

Polyesters are preferably used which are obtainable from at least two different polyhydric alcohols and one or more dicarboxylic acids containing a maximum of 12 C atoms, such as for example ethanediol-1,4-butanediol polyadipate, 1,6-hexanediol-neopentyl glycol polyadipate and 1,6-hexanediol-1,4-butanediol polyadipate.

It is also possible to use mixtures of polyesters having various molecular weights. The different molecular weights of the polyesters in the mixture can be obtained by using different polyhydric alcohols and/or dicarboxylic acids and/or, where identical alcohols and dicarboxylic acids are used, via the chain length.

Chain lengthening agents or chain extenders which are employed in accordance with the present invention include diols, optionally mixed with small amounts of diamines, and having a molecular weight of 60 to 400, and preferably aliphatic diols having 2 to 14 carbon atoms, such as e.g. ethanediol, 1,6-hexanediol, diethylene glycol, dipropylene glycol, ethylene glycol and in particular 1,4-butanediol. However, diesters of terephthalic acid with glycols having 2 to 4 carbon atoms, e.g. terephthalic acid bis-ethylene glycol or terephthalic acid bis-1,4-butanediol, hydroxyalkylene ethers of hydroquinone, e.g. 1,4-di(β-hydroxyethyl)-hydroquinone, ethoxylated bisphenols, e.g. 1,4-di(β-hydroxyethyl)-bisphenol A, (cyclo)aliphatic diamines, such as isophoronediamine, ethylenediamine, 1,2-propylenediamine, 1,3-propylenediamine, N-methyl-propylene-1,3-diamine and N,N'-dimethylethylenediamine, and aromatic diamines, such as 2,4-toluylenediamine, 2,6-toluylenediamine, 3,5-diethyl-2,4-toluylenediamine or 3,5-diethyl-2,6-toluylenediamine or primary mono-, di-, tri- or tetraalkyl-substituted 4,4'-diaminodiphenylmethanes, are also suitable. Ethanediol, 1,4-butanediol, 1,6-hexanediol, 1,4-di(β-hydroxy-ethyl)-hydroquinone or 1,4-di(β-hydroxyethyl)-bisphenol A are preferably used as chain lengtheners/extenders. Mixtures of the above-mentioned chain lengtheners/extenders can also be employed. In addition, relatively small amounts of triols can be added.

Conventional monofunctional compounds, e.g. as chain terminators or mold release aids, can furthermore also be added in small amounts. Examples which may be mentioned are alcohols, such as octanol and stearyl alcohol, or amines, such as butylamine and stearylamine.

For preparation of the TPU, the builder components, optionally in the presence of catalysts, auxiliary substances and/or additives, can be reacted in amounts such that the equivalent ratio of NCO groups to the sum of the NCO-reactive groups, in particular the OH groups of the low molecular weight diols/triols and polyols, is from 0.9:1.0 to 1.1:1.0, preferably 0.95:1.0 to 1.10:1.0.

Suitable catalysts according to the invention include the conventional tertiary amines known from the prior art, such as, for example, triethylamine, dimethylcyclohexylamine, N-methylmorpholine, N,N'-dimethylpiperazine, 2-(dimethylaminoethoxy)ethanol, diazabicyclo[2,2,2]-octane and the like and, in particular, organometallic compounds, such as titanic acid esters, iron compounds or tin compounds, such as tin diacetate, tin dioctoate, tin dilaurate or the tin-dialkyl salts of aliphatic carboxylic acids, such as dibutyltin diacetate or dibutyltin dilaurate or the like. Preferred catalysts are organometallic compounds, in particular titanic acid esters and iron and tin compounds. The total amount of catalysts in the TPU is, in general about 0 to about 5 wt. %, preferably 0 to 1 wt. %, based on 100 wt. % of the TPU.

In addition to the TPU components and the catalysts, auxiliary substances and/or additives can also be added. Some examples which may be mentioned include lubricants, such as fatty acid esters, metal soaps thereof, fatty acid amides, fatty acid ester-amides and silicone compounds, antiblocking agents, inhibitors, stabilizers against hydrolysis, light, heat and discoloration, flameproofing agents, dyestuffs, pigments, inorganic and/or organic fillers and reinforcing agents. Reinforcing agents are, in particular, fibrous reinforcing substances, such as e.g. inorganic fibers, which are prepared according to the prior art and can also be charged with a size. Further details on the auxiliary substances and additives mentioned are to be found in the technical literature, for example the monograph of J. H. Saunders and K. C. Frisch "High Polymers", volume XVI, Polyurethane, part 1 and 2, Verlag Interscience Publishers 1962 and 1964, the Taschenbuch für Kunststoff-Additive by R. Gächter and H. Müller (Hanser Verlag Munich 1990) or DE-A 29 01 774.

Further additives which can be incorporated into the TPU include thermoplastics such as, for example polycarbonates and acrylonitrile/butadiene/styrene terpolymers, in particular ABS. Other elastomers, such as rubber, ethylene/vinyl acetate copolymers, styrene/butadiene copolymers and other TPU, can also be used. Commercially available plasticizers, such as phosphates, phthalates, adipates, sebacates and alkylsulfonic acid esters, are furthermore suitable for incorporation.

The TPU of the present invention is adjusted to a Shore A hardness of 45 to 65 by adjusting the molar ratio of polyol to chain lengthener/extender.

The TPU is prepared in several stages as described herein below.

The relative amounts or quantities of the reaction components for the formation of the isocyanate-terminated prepolymer of stage A) are chosen such that the NCO:OH ratio of diisocyanate to polyol in stage A) is 1.1:1 to 1.9:1. preferably 1.1:1 to 1.7:1.

The components are mixed intimately, and the prepolymer reaction of stage A) is preferably brought substantially to complete conversion (based on the polyol component).

Subsequently, in stage B), an additional quantity of diisocyanate, preferably the same diisocyanate as under Stage A), is then added.

Thereafter, the chain lengthener/extender is mixed in intensively, and the reaction is brought to completion, stage C).

The TPU of the present invention can be prepared either discontinuously or continuously. The best known industrial preparation processes for this are the belt process (as described in, for example, GB-A 1 057 018, the disclosure of which is herein incorporated by reference) and the extruder process (as described in DE-A 1 964 834, DE-A 2 059 570 and U.S. Pat. No. 5,795,948, the disclosures of which are herein incorporated by reference).

The known mixing, units, preferably those which operate with a high shear energy, are suitable for the preparation of the TPU. Examples which may be mentioned for the continuous preparation are co-kneaders, preferably extruders, such as e.g. twin-screw extruders, and Buss kneaders.

The TPU can be prepared, for example, on a twin-screw extruder by preparing the prepolymer in the first part of the extruder and following with the diisocyanate addition and chain lengthening/extending in the second part. The addition of the diisocyanate and chain lengthener/extender here can take place in parallel in the same metering opening of the extruder, or preferably in succession in two separate openings. According to the present invention, however, the metering of the chain lengthener/extender should not take place before the metering of the further diisocyanate (i.e. the second portion of diisocyanate).

However, the prepolymer can also be prepared outside the extruder in a separate preceding prepolymer reactor, discontinuously in a tank or continuously in a tube with static mixers or a stirred tube (tubular mixer).

A prepolymer prepared in a separate prepolymer reactor can, however, also be mixed with the diisocyanate by means of a first mixing apparatus, e.g. a static mixer, and reacted with the chain lengthener/extender by means of a second mixing apparatus, e.g. a mixing head. This reaction mixture is then applied continuously to a carrier, preferably a conveyor belt, analogously to the known belt processes, where it is allowed to react until the material has solidified to form the TPU, optionally with heating of the belt.

The TPU's prepared by the process according to the invention are very soft (45 to 65 Shore A) and have good mechanical properties. During processing by injection molding, the components solidify very rapidly and are therefore easy to release from the mold. Because of a low shrinkage, the injection-molded components have a high dimensional accuracy and are very heat-stable.

The TPU's prepared by the process according to the invention still have very good elastic properties (i.e. no soft segment crystallization) even at low temperatures, which manifests itself by a low modulus level at −10° C. in dynamic mechanical analysis over the temperature (DMA:modulus of elasticity in tension).

The TPU's prepared by the process according to the invention are used for the production of soft, flexible injection-molded components such as, for example, shoe soles, grip caps, sealing components and dust caps. In combination with other thermoplastics, products with a pleasant handle (hard-soft combination) are obtained.

Extruded articles, such as e.g. profiles and hoses, can also be produced therefrom.

The invention is to be explained in more detail with the aid of the following examples.

The invention is further illustrated but is not intended to be limited by the following examples in which all parts and percentages are by weight unless otherwise specified.

EXAMPLES

The following components were employed in the preparation of the TPU, and the relative amounts of the components, and the properties of the resultant TPU are set forth in Tables 1 and 2.
Preparation of the TPU:
Stage A):
In accordance with Table 1, the corresponding polyol (at 190° C.), and a suitable first portion (i.e. portion 1) of 4,4'-diphenylmethane-diisocyanate (MDI), heated to 60° C., were brought to a conversion of >90 mol %, based on the polyol, in a reaction vessel, while stirring.

In Examples 1 and 2 the reaction was catalyzed with 3 ppm (based on the polyol) of Tyzor AA 95 (from Dupont) and in Example 7 with 15 ppm thereof.

Stage B):
The second portion of MDI (i.e. portion 2) was added to the stirred reaction mixture from A).
Stage C):
Butane-1,4-diol was then mixed in intensively to the mixture from stage B), and after approx. 15 sec., the reaction mixture was poured on to a coated metal sheet and after-conditioned at 120° C. for 30 minutes.

TABLE 1

Components and Relative Amounts used to Form TPU's:

| Example | Polyol | Amount of polyol [mol] | MDI portion 1 [mol] | MDI portion 2 [mol] | Amount of 1,4-butanediol [mol] |
|---|---|---|---|---|---|
| 1* | 2 | 1 | 1.90 | 0 | 0.90 |
| 2 | 2 | 1 | 1.25 | 0.65 | 0.90 |
| 3 | 1 | 1 | 1.20 | 0.20 | 0.40 |
| 4 | 3 | 1 | 1.25 | 0.65 | 0.90 |
| 5* | 4 | 1 | 1.50 | 0.40 | 0.90 |
| 6 | 1 and 4 | 0.5 + 0.5 | 1.20 | 0.20 | 0.40 |
| 7 | 5 | 1 | 1.25 | 1.15 | 1.40 |
| 8* | 6 | 1 | 1.50 | 0.50 | 1.00 |

*comparison example not according to the invention
Polyol 1 = a polytetramethylene ether glycol having a molecular weight of 1,000 (commercially available from Dupont)
Polyol 2 = a hexanediol-neopentylglycol adipate having a molecular weight of 2,000 (commercially available from Bayer)
Polyol 3 = a butanediol-ethylene glycol adipate having a molecular weight of 2,000 (commercially available from Bayer)
Polyol 4 = a polytetramethylene ether glycol having a molecular weight of 2,000 (commercially available from Dupont)
Polyol 5 = polyether L 5050 (from Bayer: polyethylene propylene glycol; molecular weight 2000)
Polyol 6 = Desmophen ® PE 225 B (from Bayer: butanediol adipate molecular weight 2200)

The cast sheets from stage C were cut and granulated. The granules were melted in an injection molding machine D 60 (32-screw) from Mannesmann and shaped to bars (mold temperature: 40° C.; bar size: 80×10×4 mm) or sheets (mold temperature: 40° C.; size: 125×50×2 mm).
Measurements:
The measurement of the hardness of the TPU's was carried out in accordance with DIN 53505, and the measurement in the tensile test in accordance with ISO 37. The measurement of the shrinkage, which is important for evaluation of the injection molding processing, was carried out analogously to DIN 16770 (part 3).

The relative longitudinal shrinkage after conditioning (at 80° C./15 hours) of the injection molded articles is stated in % in relation to the mold length.
Dynamic Mechanical Analysis (DMA: Storage E Modulus in Tension)

Rectangles (measuring 30 mm×10 mm×2 mm) were stamped out of the injection-molded sheets. These test sheets were stimulated periodically with very small deformations under a constant preload, optionally depending on the storage modulus, and the force acting on the clamping was measured as a function of temperature and stimulation frequency. The preload additionally applied serves to keep the specimen still adequately tensioned at the time of negative deformation amplitudes. The DMA measurements were carried out with the Seiko DMS model 210 from Seiko with 1 Hz in the temperature range from −150° C. to 200° C. with a heating rate of 2° C./min.

To characterize the properties according to the invention at low temperatures, the storage E modulus in tension was measured at −10° C. and at +20° C. for comparison and stated.

To characterize the heat stability, the temperature T at which the value falls below 2 MPa, i.e. a stable form of the injection-molded component was no longer maintained, is stated. The higher the temperature value, the more stable the TPU.

The solidification properties in the injection molding processing are characterized by hardness measurement on a standard test specimen directly on release from the mold (after 0 sec) and 60 sec after release from the mold. The higher these two initial values, the faster the TPU solidifies and the sooner it can be released from the mold.

TABLE 2

Results

| | | \multicolumn{8}{c}{Example} | | | | | | | |
|---|---|---|---|---|---|---|---|---|---|
| | | 1* | 2 | 3 | 4 | 5* | 6 | 7 | 8* |
| Hardness immediately | Shore A | 60 | 62 | 64 | 61 | 64 | 59 | 60 | 85 |
| Hardness after 4 weeks | Shore A | 60 | 62 | 65 | 61 | 66 | 59 | 60 | 95 |
| Shrinkage of the plate | in % | 7.1 | 2.6 | 3 | 1.8 | 0.7 | 2.6 | 1.3 | 10.3 |
| Injection molding: | | | | | | | | | |
| Hardness after 0 secs. | Shore A | 32 | 34 | 37 | 37 | 29 | 28 | 26 | 38 |
| Hardness after 60 secs. | Shore A | 35 | 37 | 43 | 39 | 45 | 30 | 28 | 43 |
| DMA measurement: | | | | | | | | | |
| E modulus (−10° C.) | MPa | 9 | 10 | 9 | 12 | 75 | 16 | 9 | 280 |
| E modulus (20° C.) | MPa | 6 | 6 | 7 | 7 | 9 | 6 | 6 | 107 |
| T(2 MPa) | ° C. | 96 | 106 | 113 | 105 | 128 | 113 | 129 | 129 |
| Tensile strength | MPa | 18 | 17 | 32 | 20 | 32 | 23 | 13 | 44 |
| Elongation at break | % | 765 | 850 | 739 | 813 | 759 | 751 | 880 | 620 |

*Comparative example not according to the invention

A very soft TPU was obtained directly in a simple manner, even without the addition of plasticizers, by the multi-stage process according to the invention.

These TPU's have very good mechanical properties, are readily processable and, because of a rapid rate of solidification, are easy to release from the mold. The injection-molded components have a very low shrinkage for TPU with this low hardness.

The E modulus values of the DMA at −10° C. are in the same range as those at +20° C., i.e. the products still have good elastic properties even at low temperatures. After-hardening (after 4 weeks) also does not occur. At high temperatures, the TPU's according to the invention are very heat-stable.

When using a butanediol adipate as the polyester the desired soft range is not obtained (comparative example 8), despite the same low arithmetic hardness, due to soft segment crystallization.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of thermoplastically processable polyurethane elastomers which are readily released from the mold and are characterized by a hardness of 45 to 65 Shore A (measured in accordance with DIN 53 505), a tensile strength of greater than 12 MPa (measured in accordance with ISO 37), a shrinkage of ≦3.5% (measured in accordance with DIN 16 770, part 3) and a DMA storage E modulus in tension at −10° C. of less than 20 MPa, comprising A) reacting, optionally in the presence of catalysts,
  (1) one or more linear hydroxyl-terminated polyols selected from the group consisting of:
    a) polyester polyols with number-average molecular weights of 450 to 5,000, which are obtained by reacting a mixture of at least two different polyhydric alcohols with one or more dicarboxylic acids having a maximum of 12 C atoms,
    b) mixtures of at least two polyester polyols having different number-average molecular weights of 450 to 5,000,
    c) mixtures of at least two polyether polyols having different number-average molecular weights of 450 to 5,000,
    d) polyether polyols having number-average molecular weights of 450 to 5,000, and containing at least two different alkylene oxide units, and
    e) polyether polyols containing one alkylene oxide unit and having number-average molecular weights of 450 to 1,500, with
  (2) one or more diisocyanates in a molar NCO:OH ratio of 1.1:1 to 1.9:1, form an isocyanate-terminated prepolymer, B) mixing the prepolymer prepared in step A) with organic diisocyanates, C) reacting the mixture obtained in step B) with one or more diol chain extenders having molecular weights of 60 to 400, wherein a molar NCO:OH ratio of the components employed in A), B) and C) of 0.9:1 to 1.1:1 is adjusted and wherein the ratio of the OH groups of the polyol to the OH groups of the chain extender is 0.3:1 to 2.0:1.

2. A process for preparing thermoplastically processable polyurethane elastomers according to claim 1, wherein said organic diisocyanate is selected from the group consisting of 4,4'-diphenylmethane diisocyanate, isophorone diisocyanate, 1,6-hexamethylene diisocyanate, 1,5-naphthylene diisocyanate, 4,4'-dicyclohexylmethane diisocyanate, and mixtures thereof.

3. A process for preparing thermoplastically processable polyurethane elastomers according to claim 1, wherein said diol chain extender is selected from the group consisting of ethylene glycol, 1,4-butanediol, 1,6-hexanediol, 1,4-di-(betahydroxyethyl)-hydroquinone and 1,4-di-(betahydroxyethyl)-bisphenol A.

4. The process of claim 1, wherein the molar NCO:OH ratio of the components employed in A), B) and C) is from 1.1:1 to 1.7:1, and wherein the ratio of OH groups of the polyol to the OH groups of the chain extender is from 0.4:1 to 1.5:1.

* * * * *